April 24, 1951     J. M. OBERHOLTZER     2,550,588

RING DYNAMOMETER

Filed May 27, 1947

INVENTOR.
JOHN M. OBERHOLTZER

BY William R. Lane

ATTORNEY

UNITED STATES PATENT OFFICE 2,550,588

RING DYNAMOMETER

John M. Oberholtzer, Los Angeles, Calif., assignor to North American Aviation, Inc.

Application May 27, 1947, Serial No. 750,810

4 Claims. (Cl. 73—141)

This invention relates to a force measuring device comprising a ring dynamometer adapted to utilize strain gauges in connection therewith.

It is an object of this invention to modify a ring dynamometer so as to increase its sensitivity.

It is another object of this invention to provide a ring dynamometer of high sensitivity and having a high safety factor.

Other objects of invention will become apparent from the following description taken in connection with the attached drawings in which Fig. 1 is a perspective view of an arrangement illustrating the present invention;

Figure 1:
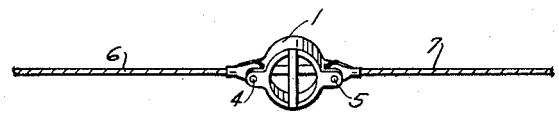
Figure 4:
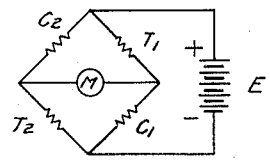
Fig. 4 is a diagrammatic illustration of a circuit arrangement in the form of a Wheatstone bridge embodying the strain gauges used in connection with this invention.
Figure 2:
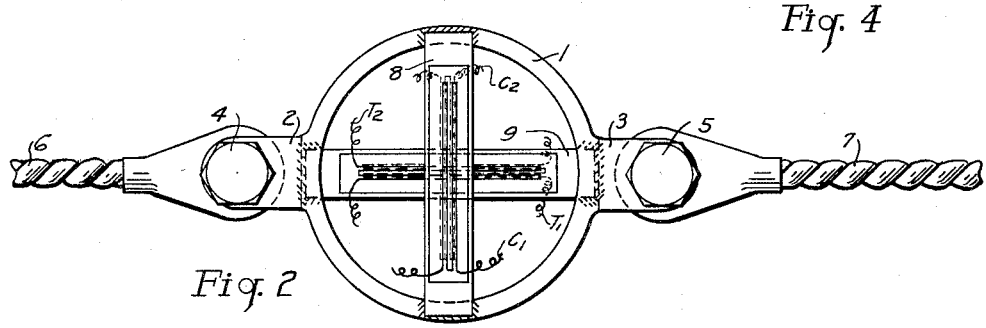
Fig. 2 is a top plan view of the same showing strain gauges applied thereto.
Figure 3:
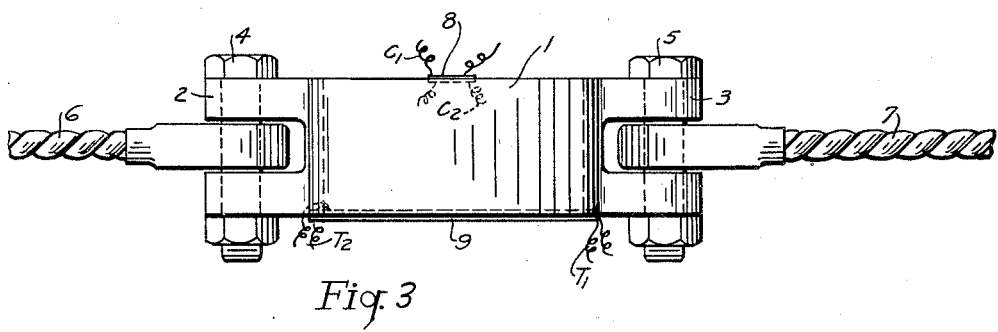
Fig. 3 is an elevational view of the showing in Fig. 2.

Referring to the drawings, 1 represents a ring dynamometer of suitable material adapted to be attached by ears 2 and 3 and bolts 4 and 5 to cables 6 and 7 which in turn are suitably connected to a force producing device and a member to be tested such as a control member or the like. The ring 1 has suitably attached thereto members 8 and 9, one of which is positioned at the top and the other of which is positioned at the bottom of the ring 1. Member 8 is positioned in the ring under tension by suitably elongating the same while it is being attached, whereas member 9 is substantially unstressed under normal conditions. Suitably attached to the upper part of member 8 is a strain gauge $C_1$ of the type in which the electrical resistance thereof changes therein in response to elongation or compression and which may therefore be used as a measure of strain in a member to which it is attached. A second strain gauge $C_2$ is attached to the bottom of member 8 while strain gauges $T_1$ and $T_2$ are attached respectively to the bottom and top of member 9. These gauges are electrically connected together and to a source of electrical energy E in a Wheatstone bridge arrangement as illustrated in Fig. 4.

Member 8 is positioned under tension to avoid buckling thereof upon application of a load to ring 1 through cables 6 and 7. Strain gauges are located on the tops and bottoms of members 8 and 9 respectively to increase the sensitivity thereof. This has been found desirable by reason of the fact that elongation characteristics of members to be tested are within the range of those of the ring dynamometer and by positioning the strain gauges as herein indicated a factor of safety is introduced into the measuring arrangement which will enable the testing of expensive equipment without risk of breakage thereof.

Increased sensitivity is obtained by connecting as adjacent legs on the Wheatstone bridge top and bottom gauges respectively of the members 8 and 9. By this arrangement stresses measured by such gauges are additive, resulting in a highly sensitive device.

In the operation of the device, members 6 and 7 are suitably tensioned tending to elongate ring 1 which in turn tensions and stresses member 9 while relieving the tension in member 8 to thereby shorten the same. By reason of the various gauges being connected as illustrated, a highly sensitive instrument is obtained, the stresses in respect of which may be measured by an instrument M connected across the Wheatstone bridge as illustrated in Fig. 4.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A dynamometer comprising a ring, means attached to said ring to transmit load thereto to strain the same, a strain responsive element attached to said ring in alignment with said attaching means, a pre-tensioned strain responsive element attached to said ring in a direction transverse to said first strain responsive element, resistance type electrical strain gauges bonded to said two elements, and means connected to said strain gauges for indicating the measured stress.

2. A device as recited in claim 1 in which horizontally extending electrical strain gauges are bonded to the tops and bottoms of said two elements and connected to form a Wheatstone bridge in which the respective top and bottom gauges form opposed legs of said bridge.

3. A dynamometer comprising means responsive to load applied thereto, means for measuring applied load comprising a strain responsive element located in the direction of such load, a strain responsive element located transverse to said load, one of said elements being compressed and the other of said elements being tensioned under such applied load, said compressed element being pre-tensioned to avoid buckling under load, resistance type electrical strain gauge means attached to said elements for measuring strain therein, and means connected to said strain gauge means for indicating the measured strain.

4. A device as recited in claim 3 in which said electrical strain gauge means are horizontally extending and located on the tops and bottoms of said elements and interconnected in the form of a Wheatstone bridge in which the top and bottom electrical strain gauges form respectively opposed legs of the Wheatstone bridge.

JOHN M. OBERHOLTZER.

REFERENCES CITED

The following references are of record in the file of this patent:

UNITED STATES PATENTS

| Number | Name | Date |
|---|---|---|
| 1,912,213 | Nicolson | May 30, 1933 |
| 2,414,161 | Moore | Jan. 14, 1947 |
| 2,440,706 | Tint | May 4, 1948 |